United States Patent [19]

Wallace et al.

[11] Patent Number: 4,567,032
[45] Date of Patent: Jan. 28, 1986

[54] ZIRCONIUM-MANGANESE-IRON ALLOYS

[75] Inventors: William E. Wallace, Pittsburgh, Pa.; Gui Y. Yu, Naujing, China

[73] Assignee: Koppers Company, Inc., Pittsburgh, Pa.

[21] Appl. No.: 741,580

[22] Filed: Jun. 5, 1985

[51] Int. Cl.$^4$ .................. C01B 6/00; C22C 30/00
[52] U.S. Cl. .................. 423/644; 470/581; 470/900
[58] Field of Search .......... 423/644, 648 R; 420/422, 900, 580, 581

[56] References Cited

U.S. PATENT DOCUMENTS 4,412,782  11/1983  Wallace et al. .................. 423/644

OTHER PUBLICATIONS

Pouraricon F. et al., "Stability and Magnetism of Hydride of Non-Stoichiometric ZrMn$_2$", J. Phys. Chem., 1981, 85, pp. 3105-3111.

Shaltiel D. et al., "Hydrogen Absorption and Desorption Properties of AB$_2$ Laves-Phase Pseudobinary Compounds", J. Less. Comm. Metal 53, (1977), pp. 117-131.

Primary Examiner—Christopher W. Brody
Attorney, Agent, or Firm—Donald M. MacKay; Herbert J. Zeh, Jr.

[57] ABSTRACT

Hydrogen storage materials are provided of a ternary alloy of the formula:

$$ZrMnFe_x$$

wherein x has a value from 1.2 to 1.3, and their hydrides.

6 Claims, 4 Drawing Figures

PRESSURE COMPOSITION ISOTHERM, FOR Zr Mn Fe$_{1.2}$-H$_2$

ZIRCONIUM-MANGANESE-IRON ALLOYS

BRIEF DESCRIPTION OF THE INVENTION

Hyperstoichiometric alloys of zirconium, manganese and iron are provided of the formula:

$$ZrMnFe_x$$

wherein x has a value in a range from 1.2 to 1.3, and their hydrides. The compounds have the hexagonal C-14 ($MgZn_2$) type structure.

DETAILED DESCRIPTION OF THE INVENTION

Figure 1:
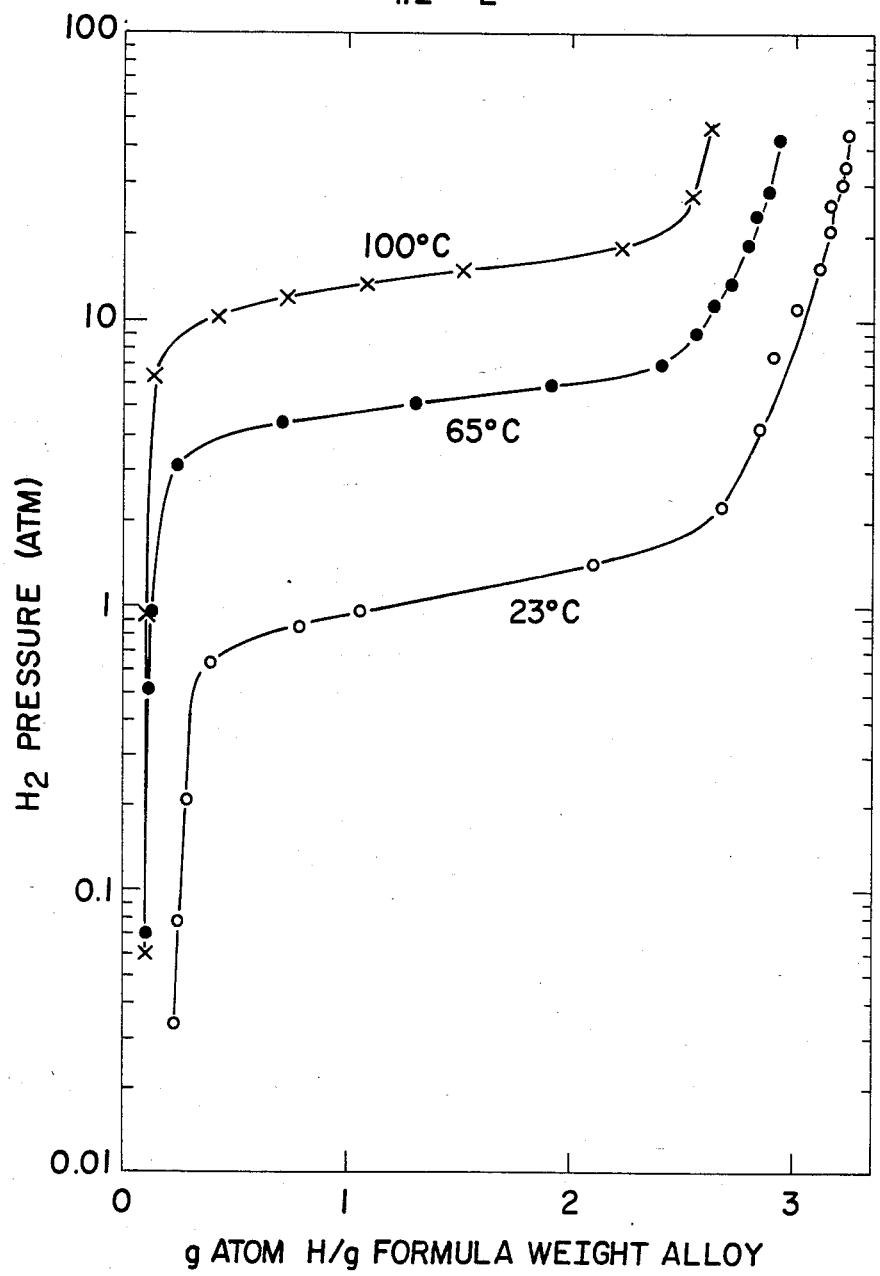
FIG. 1 is a Pressure-composition isotherm for the $ZrMnFe_{1.2}$-$H_2$ alloy.

A ternary alloy of the invention is characterized as a Laves-type intermetallic compound composed of zirconium, manganese, and iron in a C14 hexagonal crystal stucture. The crystal structure has lattice parameters in the following ranges:
a=4.988 Å to 4.996 Å
c=8.163 Å to 8.178 Å

A general procedure for preparations of these ternary alloys is as follows. Weighed amounts of the zirconium and iron constituents were placed in a copper boat for heating to a fusing temperature. Heating was accomplished by means of an r.f. 450 KHz induction heater. The copper boat was mounted inside a vacuum-tight quartz tube through which a stream of Ti-gettered argon passed during the heating period. Fusing took place by heating a mixture of these constituents to about 1500° C. in about two minutes and holding at that temperature for about two minutes. Then the sample was cooled to room temperature in a period of about one minute and the hardened sample was turned over in the boat. Melting and cooling were repeated through 5-6 cycles and the sample turned over before each melting. After two melting/cooling cycles, the sample was weighed for determination of weight loss, which loss typically was negligible. Then a weighed amount of manganese, which includes a 10% stoichiometric excess of manganese over the amount desired in the final sample, was added to the fused zirconium-iron sample. Excess manganese was required to compensate for loss of manganese by evaporation. The sample was melted and weighed repititiously until the weight corresponded to that of the sample with the appropriate amount of Mn. Usually, the actual manganese content of a sample was controlled to within ± one percent of the theoretrical amount. Then the sample was annealed at about 950°-1000° C. for 4 hours to insure homogeneity. X-ray diffraction analysis of the annealed sample typically shows a material consisting of a single phase.

It was necessary to subject these specimens to an activation procedure prior to the Pressure composition isotherm (PCI) measurements. They were first heated to 350°-400° C. and held at this temperature for 4-6 hours. Subsequently they were quenched in an ice-water bath or liquid nitrogen. The amount of hydrogen absorbed was observed to increase with each cycle. After it reached a maximum value the PCI measurements were initiated. The pressure was recorded after it remained constant for 0.5-1 hr. At low pressure (below 1 atm), time for the system to reestablish equilibrium was observed to be as long as 10 hrs.

In order to activate the sample to make it suitable as a hydrogen storage material, about two grams of the annealed sample was placed in a stainless-steel pressure reactor vessel suitable for use in forming a hydride of the sample. The reactor was evacuated to a pressure of about $10^{-3}$ Torr. Then pure hydrogen was pumped into the reactor vessel with the temperature initally at about 25° C., until hydrogen was no longer absorbed by the sample. Usually, within two minutes of the time hydrogen was initially introduced into the reactor, the reaction vessel temperature increased to about 50° C. Then the reactor was allowed to cool to room temperature over a period of about 30 minutes, after which time the pressure within the reactor was usually about 45 atm. The pressure in the reactor was reduced to ambient, and then the sample was subjected to a pressure of about $10^{-3}$ Torr for about 20 minutes in order for the sample to desorb substantially all of the previously-absorbed hydrogen.

In order to obtain a fully-activated hydrogen storage material, the sample was subjected to about 25 sorption/desorption cylces, under conditions as described for the activation procedure above. At the end of this activating period, there was obtained a repeatable pressure-composition profile. To obtain crystal structure data on the hydrides, a portion of the activated sample was hydrogenated to a known composition in accordance with the previously-established pressure-composition isotherm. Then the hydrogenated sample was cooled quickly by quenching the sample boat (reactor) in liquid nitrogen, and rapidly pumping away remaining gaseous hydrogen. In accordance with the technique of Gualtieri et al., [J. Appl. Phys., 47,3432 (1976)], a few Torr of $SO_2$ was admitted to the reaction vessel to poison the surface of the sample and thereby seal in the hydrogen. After the sample warms to room temperature, X-ray diffraction data is obtained for the sample.

In order to demonstrate the preparation of the zirconium-manganese-iron ternary alloys and their hydrides, and to obtain data as to characteristics and properties of the alloys, three ternary alloys containing varying amounts of the three constituent elements were prepared in accordance with the aforementioned, generally-described procedures. Essential parameters such as constituent weights, melting and annealing temperatures, lattice parameters and hydriding characteristics are summarized in Tables I-II. Each of the constituents was 99.9 percent pure and was used as obtained from Alfa Products, Ventron Div., Danvers, Mass.

TABLE I

Preparation of ZrMnFe$_x$ Ternary Alloys

| Sample No. | Alloy | Each Constituent (gm) Zr | Mn | Fe | Melting Temp (°C.) | Heat Treatment Melting Cycles No. | Melt Period (Min.) | Annealing Temp (°C.) | Period (Hrs) | Sample Wt. Loss During Preparation (gm) |
|---|---|---|---|---|---|---|---|---|---|---|
| I | ZrMnFe$_{1.2}$ ZrMnFe$_{1.2}$H$_{3.2}$ | 1.602 | 0.965 | 1.777 | ~1500 | 5 | 2 | 1000 | 4 | 0.005 |
| II | ZrMnFe$_{1.3}$ ZrMnFe$_{1.3}$H$_{2.6}$ | 1.690 | 1.018 | 1.345 | ~1500 | 6 | 2 | 1000 | 4 | 0.005 |
| III | ZrMnFe$_{1.4}$ ZrMnFe$_{1.4}$H$_{0.35}$ | 1.685 | 1.015 | 1.444 | ~1500 | 6 | 2 | 1000 | 4 | 0.005 |

TABLE II

Lattice Parameters and Hydrogen Absorption for ZrMnFe$_x$ Ternary Alloys

| Sample No. | Alloy Alloy Hydride | Lattice Parameters a(Å) | c(Å) | Unit Cell Volume V(Å)$^3$ | Change in Alloy Volume in Forming Hydride ΔV/V % | Hydrogen Capacity at 20 atm and 23° C. cc H$_2$/g alloy$^a$ | r$^b$ |
|---|---|---|---|---|---|---|---|
| I | ZrMnFe$_{1.2}$ | 4.996 | 8.173 | 176.7 | | | |
| | ZrMnFe$_{1.2}$H$_{3.2}$ | 5.205 | 8.685 | 203.8 | 13.3 | 186.4 | 1.40 |
| II | ZrMnFe$_{1.3}$ | 4.988 | 8.163 | 175.9 | | | |
| | ZrMnFe$_{1.3}$H$_{2.6}$ | 5.184 | 8.618 | 200.6 | 12.3 | 149.2 | 1.13 |
| III | ZrMnFe$_{1.4}$ | 4.990 | 8.178 | 176.4 | | | |
| | ZrMnFe$_{1.4}$H$_{0.35}$ | — | — | — | — | 17.5 | 0.16$^c$ |

Figure 2:
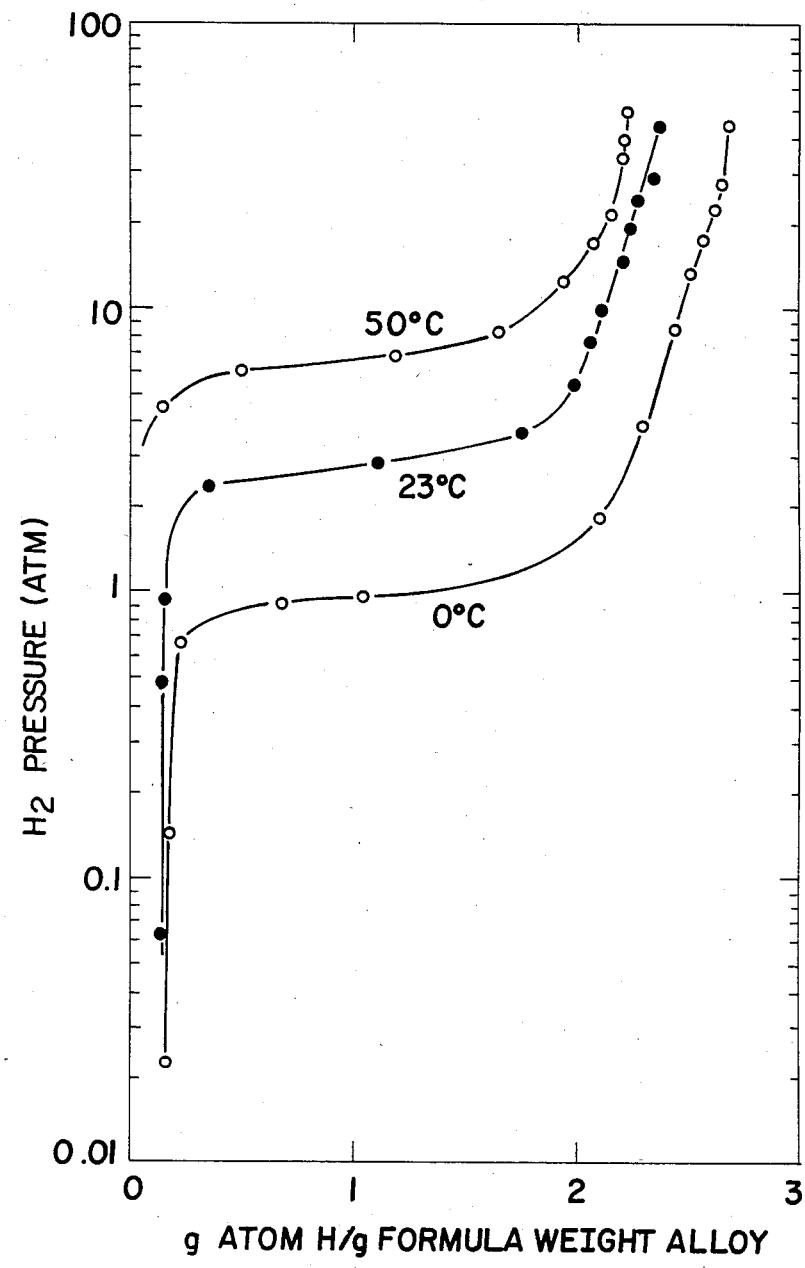
FIG. 2 is a Pressure-composition isotherm for the $ZrMnFe_{1.3}$-$H_2$ alloy.

$^a$Measured at 1 atm and 25° C.
$^b$r = the amount of H$_2$ per unit volume of alloy relative to that of the same volume of liquid hydrogen.
$^c$Assuming the same unit cell volume for ZrMnFe$_{1.4}$H$_{0.35}$ as that of ZrMnFe$_{1.4}$ = 176.4 Å$^3$ The pressure-composition isotherms of FIGS. 1-2 are associated with the two embodiments of the zirconium-manganese-iron alloys of the invention and demonstrate important advantages of these quaternary alloys. For example, at about room temperature these three alloys can be hydrogenated and dehydrogenated at hydrogen pressures of about one atm.

Figure 3A:
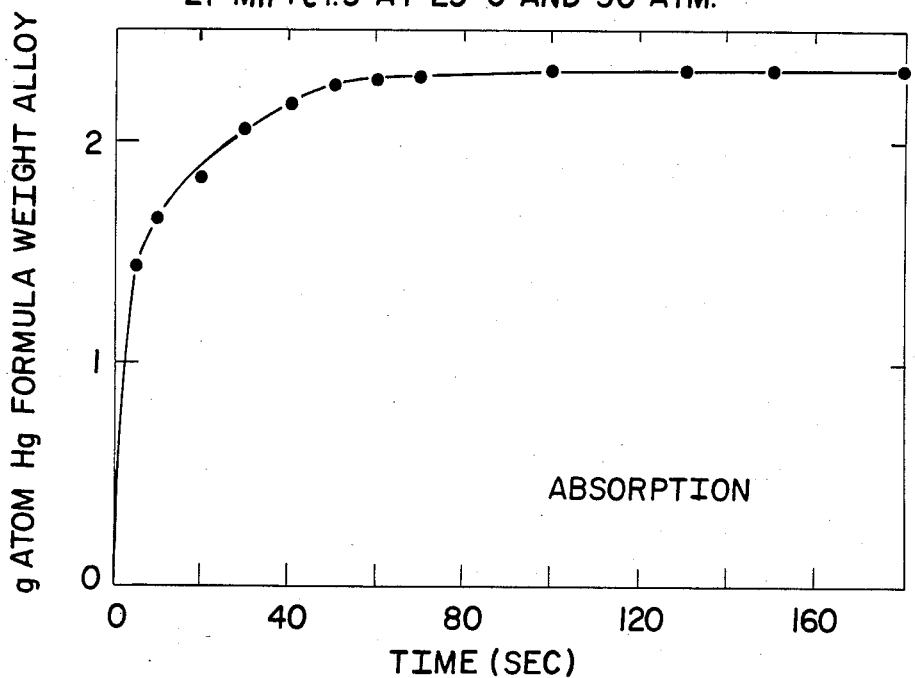
FIGS. 3A is the hydrogen absorption rate of $ZrMnFe_{1.3}$ at 23° C. and 50 atm., and 3B is the hydrogen desorption rate of $ZrMnFe_{1.3}$ hydride at 23° C.
Figure 3B:
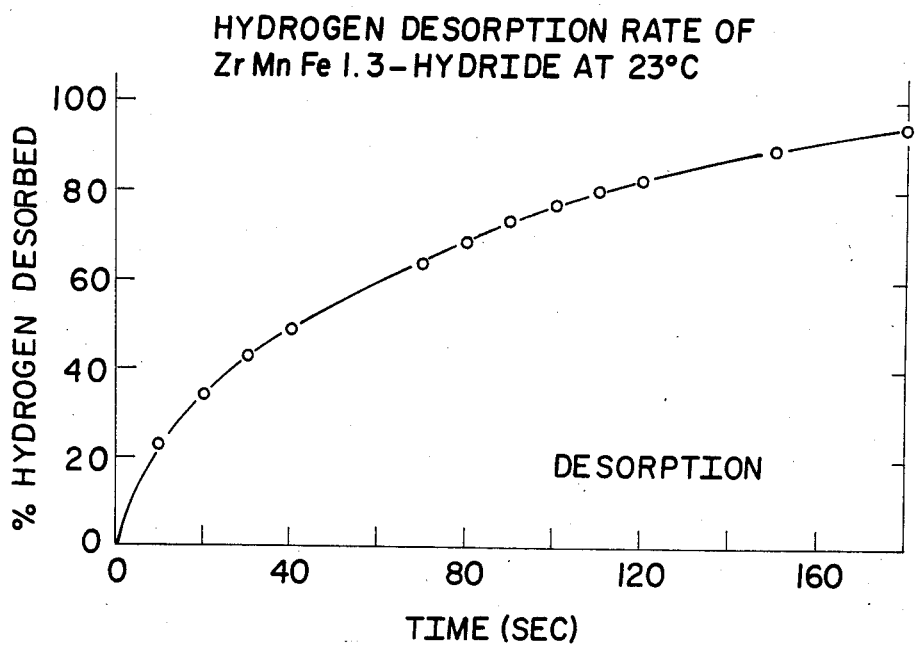

The ternary alloys of the invention are also characterized by fairly rapid absorption/desorption of hydrogen. As shown in FIGS. 3A and 3B, a condition of more than 95 percent complete absorption of hydrogen can be obtained in about 1 minute and a condition of 90% complete desorption can be obtained in about 2.5 minutes.

Although specific examples of the invention have been set forth hereinabove, it is not intended that the invention be limited solely thereto, but is to include all the variations and modifications falling within the scope of the appended claims.

What is claimed is:

1. A ternary alloy of the formula:

ZrMnFe$_x$ wherein x has a value from 1.2 to 1.3, and their hydrides.

2. The alloy of claim 1 wherein x is 1.2.
3. The alloy of claim 1 wherein x is 1.3.
4. A hydride of the alloy of claim 1.
5. A hydride of the alloy of claim 2.
6. A hydride of the alloy of claim 3.

* * * * *